(12) United States Patent
Kinoshita et al.

(10) Patent No.: US 7,392,891 B2
(45) Date of Patent: Jul. 1, 2008

(54) FRICTION PLATE FOR WET-TYPE MULTIPLATE CLUTCH

(75) Inventors: Yoshio Kinoshita, Fukuroi (JP); Shiro Takeuchi, Fukuroi (JP); Tatsuro Miyoshi, Fukuroi (JP); Shigeki Umezawa, Fukuroi (JP); Shun Kitahara, Fukuroi (JP); Tamotsu Fujii, Fukuroi (JP); Hiroyuki Kinpara, Fukuroi (JP); Kenji Maruo, Fukuroi (JP); Tomoyuki Miyazaki, Fukuroi (JP); Xiaoming Gu, Fukuroi (JP); Fumimasa Muramatsu, Fukuroi (JP); Shigeharu Nishimura, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 301 days.

(21) Appl. No.: 11/243,322

(22) Filed: Oct. 5, 2005

(65) Prior Publication Data

US 2006/0102443 A1    May 18, 2006

(30) Foreign Application Priority Data

Oct. 6, 2004 (JP) ............................. 2004-293241

(51) Int. Cl.
*F16D 13/64* (2006.01)
*F16D 13/72* (2006.01)

(52) U.S. Cl. ................... 192/70.14; 192/107 R; 192/113.36

(58) Field of Classification Search ............... 192/70.14
See application file for complete search history.

(56) References Cited

U.S. PATENT DOCUMENTS

| 2,927,673 | A | * | 3/1960 | Sand ..................... 192/70.14 |
| 5,094,331 | A | * | 3/1992 | Fujimoto et al. ........ 192/107 R |
| 5,184,704 | A | * | 2/1993 | Hays ..................... 192/70.14 |
| 5,799,763 | A | * | 9/1998 | Dehrmann .............. 192/107 C |
| 6,062,367 | A |   | 5/2000 | Hirayanagi et al. |
| 2004/0050646 | A1 | * | 3/2004 | Matthes et al. .......... 192/107 R |

* cited by examiner

*Primary Examiner*—Rodney H Bonck
(74) *Attorney, Agent, or Firm*—Crowell & Moring LLP

(57) ABSTRACT

A friction plate for a wet-type multiplate clutch provided with a core plate and friction linings fixed on opposite sides of the core plate, respectively. Each of the friction linings is formed such that at a section thereof located on a side radially inner than a radial center line thereof, the friction lining has a thickness that gradually increases from an inner circumferential portion of the section toward an outer circumferential portion of the section.

12 Claims, 5 Drawing Sheets

$$B < \frac{A}{2}$$

ered such that at a section thereof located on a side
FRICTION PLATE FOR WET-TYPE MULTIPLATE CLUTCH

FIELD OF THE INVENTION

This invention relates to a friction plate for a wet-type multiplate clutch useful in an automatic transmission, friction device or the like. It is to be noted that the term "fragmentary sector" as used herein means a geometric figure bounded by two radii and the included arc of a larger circle without a geometric figure bounded by two radii and the included arc of a smaller circle, in which the larger and smaller circles are concentric with each other and the former radii and the latter radii overlap with each other, respectively.

DESCRIPTION OF THE BACKGROUND

To improve the fuel economy of automobiles, there is an outstanding demand for a reduction in the idling drag of wet-type multiplate clutches for use in automatic transmissions or the like. With a view to meeting this demand, it has been a conventional practice to form spiral grooves, outer-end-closed grooves or the like on the surfaces of friction linings in a clutch such that under a centrifugal force, a force which pulls off a counterpart member is produced at the surface of each friction lining to reduce a drag torque in a stable state during idling.

FIG. 1 is a cross-sectional view illustrating the fundamental construction of a wet-type multiplate clutch. Separator plates 3 are connected through splines to spline grooves 51 on a drum 5, while friction plates 4 which are arranged opposite the separator plates 3 are connected through splines to spline grooves 82 on a hub 8. Upon engagement of the clutch, a piston 9 is pressed under a hydraulic pressure toward the right-hand side as viewed in the drawing so that the separator plates 3 and friction plates 4 are pressed as engagement members against a flange 2 and a snap ring 1. As a consequence, a torque is transmitted from the drum 5 to the hub 8. Designated at numeral 81 are lubrication holes arranged in the hub 8.

The friction plates 4 are each provided with a core plate 41 in the form of a metal disc and friction linings 7 fixed on opposite sides of the core plate 41, respectively. As mentioned above, the friction linings are each provided on a surface thereof with various oil passages or oil grooves so that owing to the production of a hydraulic pressure under a centrifugal force, forces which press the friction surfaces act to achieve a reduction in drag torque upon idling and a prompt release upon disengagement of the clutch.

With friction plates of the conventional construction, a large oil amount leads to a reduction in the coefficient of friction under the influence of pressure-producing grooves upon engagement of a clutch so that, while the engaging torque remains small, the engagement progresses and the torque abruptly increases at the end of braking time. Such a large oil amount, therefore, becomes a cause of a shift shock. It may, therefore, be contemplated to make the pressure-producing grooves smaller in an attempt to obtain adequate friction characteristics. This, however, leads to a reduction in the force at friction surfaces, said force serving to pull off the counterpart members during idling, thereby bringing about an increase in idling drag.

Substantial difficulties have been encountered in designing grooves such that they can achieve both a reduction in idling drag and adequate friction characteristics.

SUMMARY OF THE INVENTION

To resolve the above-described problems, the present invention provides, in one aspect thereof, a friction plate for a wet-type multiplate clutch, said friction plate being provided with a core plate and friction linings fixed on opposite sides of the core plate, respectively, wherein each of the friction linings is formed such that at a section thereof located on a side radially inner than a radial center line thereof, the friction lining has a thickness that gradually increases from an inner circumferential portion of the section toward an outer circumferential portion of the section.

In another aspect of the present invention, there is also provided a friction plate for a wet-type multiplate clutch, said friction plate being provided with a core plate and friction linings fixed on opposite sides of the core plate, respectively, wherein the friction linings are each segmented into fragmentary sectors, the fragmentary sectors are bonded on its corresponding side of the core plate, a predetermined plural number of the fragmentary sectors are each formed such that at a section thereof located on a side radially inner than a radial center line of the corresponding friction lining, the fragmentary sector has a thickness that gradually increases from an inner circumferential portion thereof toward an outer circumferential portion thereof, and the remaining ones of the radial friction lining segments have a uniform thickness.

Owing to the above-described constructions of the present invention, the present invention has made it possible to achieve both stable friction characteristics and a reduction in a drag upon idling.

FIG. 9 shows one example of characteristics of engaging torque, in which engaging torque (N·m) is plotted along the ordinate while braking time is plotted along the abscissa. An alternate long and short dash line indicates the braking time versus engaging toque characteristics of friction plates of the conventional construction. It is appreciated that, when the oil amount is increased to reduce the idling drag, the torque is small at the beginning but abruptly increases in the last stage to develop a shift shock. On the other hand, the invention construction the braking time versus engaging toque characteristics of which are indicated by a solid line are appreciated to show stable friction characteristics throughout the engagement.

DETAILED DESCRIPTION OF THE INVENTION AND PREFERRED EMBODIMENTS

In the present invention, the friction linings on each friction plate are each formed such that at a section thereof located on a side radially inner than a radial center line thereof, the friction lining has a thickness that gradually increases from an inner circumferential portion of the section toward an outer circumferential portion of the section. Each of the friction linings can define a planar, curved or stepped surface at the section. Further, the section and a remaining section of each friction lining can be made of materials having different compression characteristics, respectively.

Figure 1:
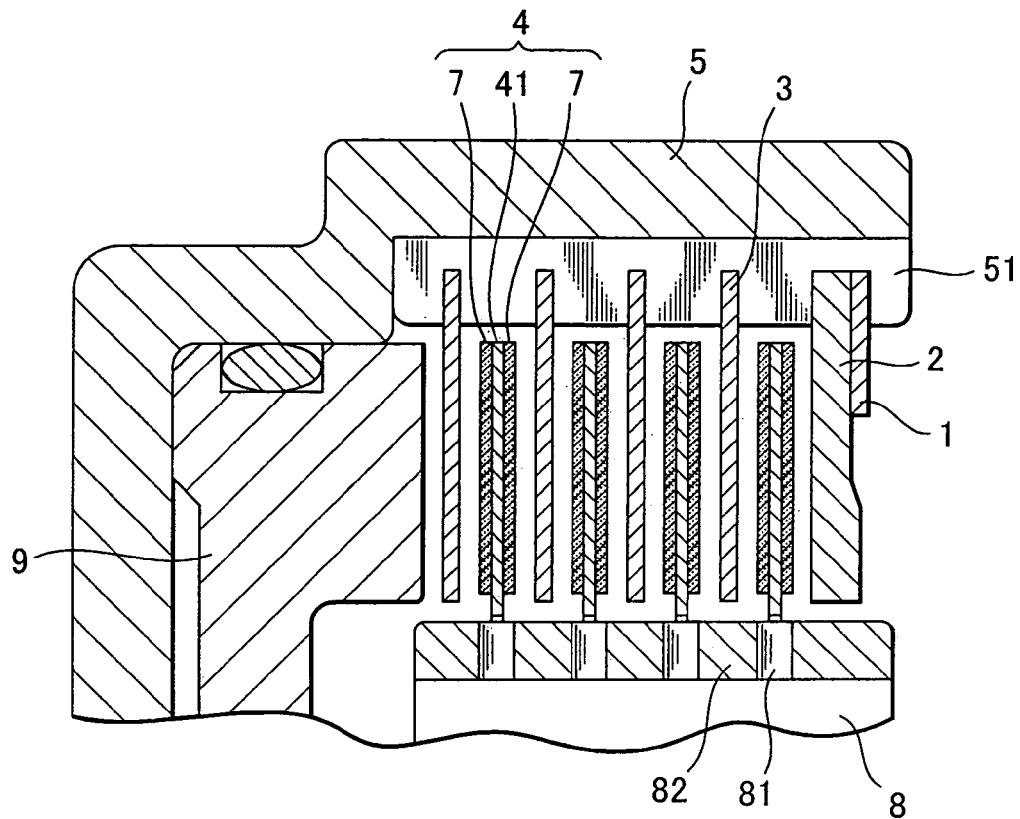
FIG. 1 is a cross-sectional view showing the fundamental structure of a wet-type multiplate clutch.
Figure 2:
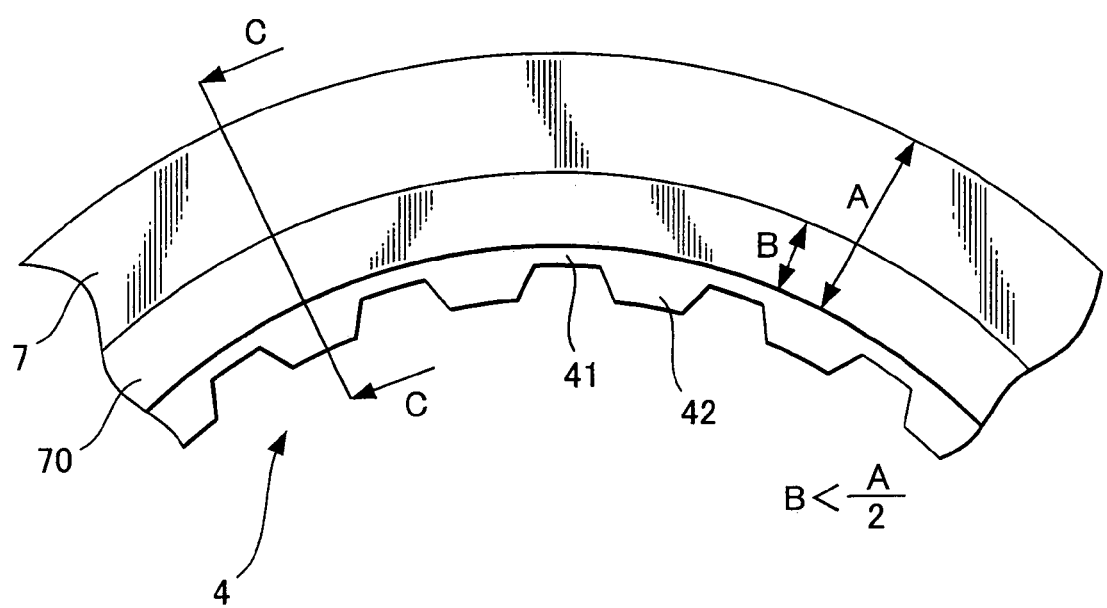
FIG. 2 is a plan view illustrating the construction of a friction plate.
Figure 3:
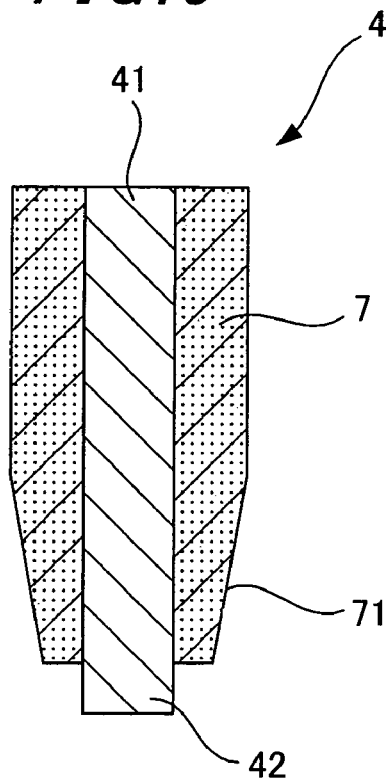
FIG. 3 is a cross-sectional view of a friction plate according to a first embodiment of the present invention as taken along line C-C of FIG. 2.
Figure 9:
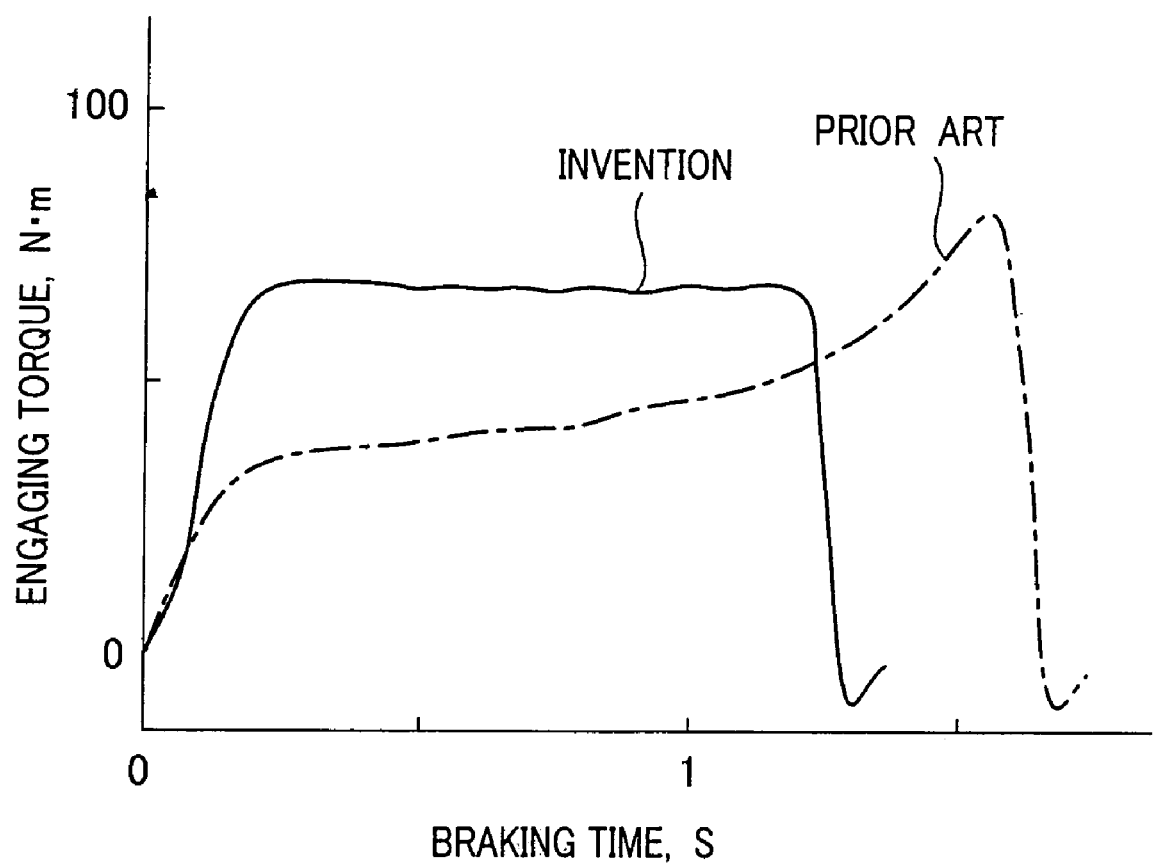
FIG. 9 is a diagrammatic representation of the torque characteristics of friction plates according to the present invention in comparison with those of friction plates of the conventional construction

Referring first to FIG. 2, a friction lining 7 fixed on a core plate 41 of a friction plate 4 (see FIG. 1), the entire radial width of said friction lining being indicated by letter A, is formed such that at an annular section 70 located on a side radially inner than a radial center line of the friction lining 7, the friction lining 7 has a thickness that gradually increases from an inner circumferential portion of the annular section 70 toward an outer circumferential portion of the annular section 70. It is to be noted that in each of FIG. 2 and the subsequent figures except for FIGS. 7 and 9, numeral 41 indicates a core plate and numeral 42 designates splines on an inner circumference of the core plate.

FIG. 3 through FIG. 6 show friction plates according to the first to fourth embodiments of the present invention as viewed in cross-section along line C-C in FIG. 2. In the first embodiment depicted in FIG. 3, an annular section corresponding to the annular section 70 in FIG. 2 defines a planar surface 71 with the thickness of said annular section gradually increasing from its inner circumferential portion toward its outer circumferential portion.

Figure 4:
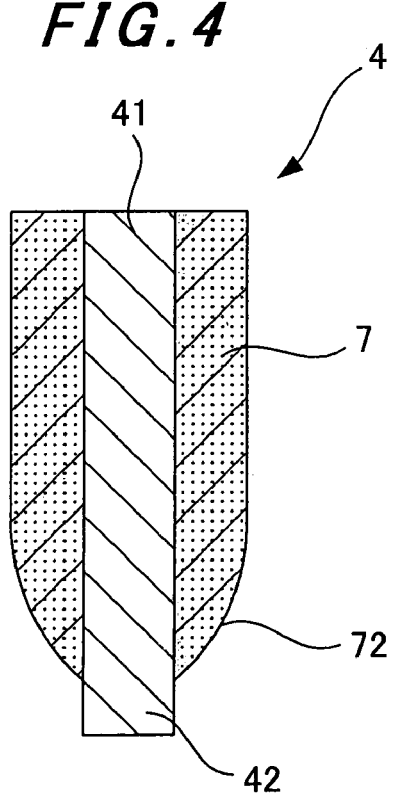
FIG. 4 is similar to FIG. 3 but depicts a friction plate according to a second embodiment of the present invention.
Figure 5:
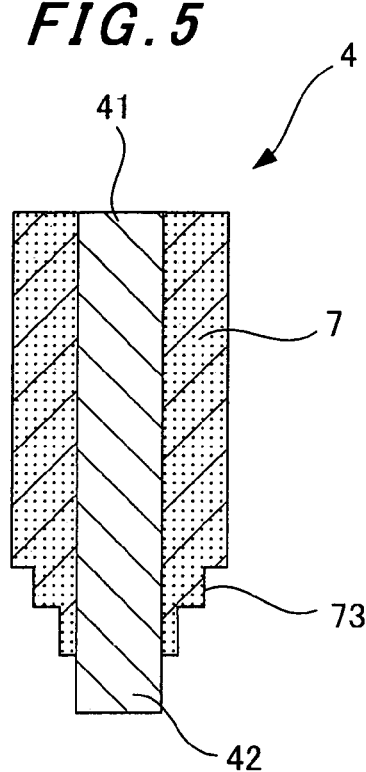
FIG. 5 is similar to FIG. 3 but illustrates a friction plate according to a third embodiment of the present invention.
Figure 6:
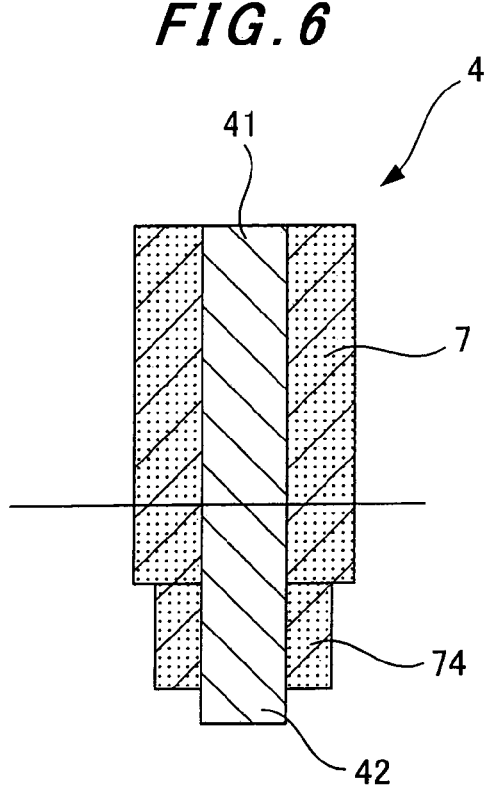
FIG. 6 is similar to FIG. 3 but illustrates a friction plate according to a fourth embodiment of the present invention.

In the second embodiment shown in FIG. 4, the annular section defines a curved surface 72, and in the third embodiment illustrated in FIG. 5, the annular section defines a stepped surface 73. In the fourth embodiment illustrated in FIG. 6, an annular section 74, which corresponds to the annular section 70 in FIG. 2, and a remaining section of a friction lining 7 are made of materials having different compression characteristics, respectively. The surfaces 72, 73 and the surface 71 shown in FIG. 3 define a radially inner section of the friction lining 7, inward from a radial center line of the friction lining 7, which has a thickness that gradually increases from an inner circumferential portion of said inner section toward an outer circumferential portion of said section. A radially outer section of the friction lining 7, outer to the radial center line and having a uniform thickness is also shown in the drawings.

Figure 7:
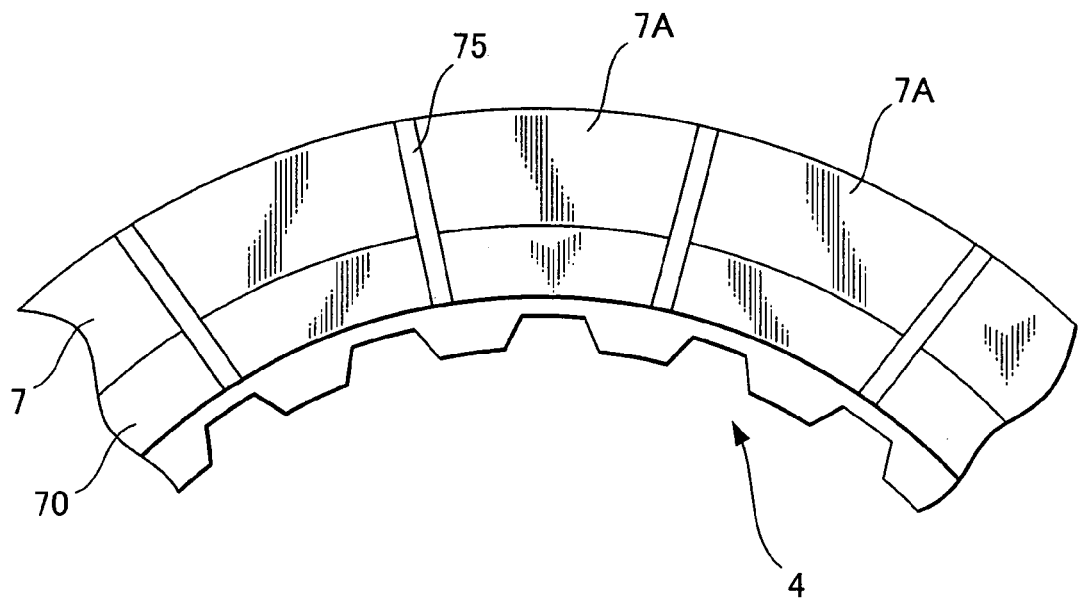
FIG. 7 is a fragmentary plan view of a friction plate according to a fifth embodiment of the present invention.

Referring back to FIG. 2, the radial width B of the annular section 70 the thickness of which gradually increases may desirably meet the following inequality: B<A/2 (A: the entire radial width of the friction lining 7). With a view to ensuring an adequate flow and distribution of oil, radial oilways 75 can be arranged at suitable angular intervals in the direction of the circumference of the friction lining 7 as shown in FIG. 7. These radial oilways 75 can be formed on the friction lining 7 by either molding or cutting. As an alternative, as illustrated in FIG. 7, a friction lining can be segmented into fragmentary sectors 7A. These fragmentary sectors 7A can then be bonded on its corresponding side of a core plate 41 with angular intervals left therebetween such that oilways 75 are formed.

Figure 8:
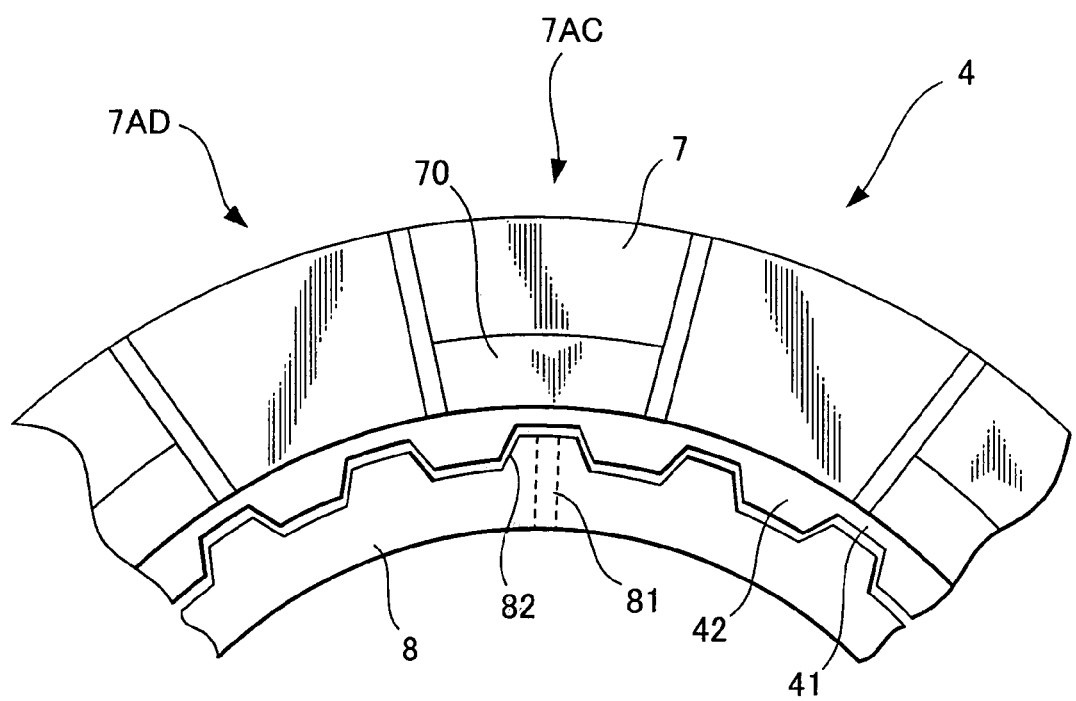
FIG. 8 is a fragmentary plan view showing a friction plate according to a sixth embodiment of the present invention in relation to an associated hub.

Reference is next had to FIG. 8. Instead of forming the section 70, the thickness of which gradually increases from its inner circumferential portion toward its outer circumferential portion, over the entire circumference of the friction lining 7 of the friction plate 4, a predetermined plural number of such fragmentary sectors, 7AC, are each formed such that at a section thereof located on a side radially inner than a radial center line of the corresponding friction lining, the fragmentary sector has a thickness that gradually increases from an inner circumferential portion thereof toward an outer circumferential portion thereof, and the remaining ones of the fragmentary sectors, 7AD, have a uniform thickness. Also as shown in FIG. 8, lubrication holes 81 of a hub 8 can be arranged in registration with the fragmentary sectors 7AC, each of which includes a section 70 having a thickness that gradually increases from an inner circumferential portion thereof toward an outer circumferential portion thereof.

The friction linings on the friction plate according to the present invention are each formed such that at the section thereof located on the side radially inner than the radial center line thereof, the friction lining has a thickness that gradually increases from the inner circumferential portion of the section toward the outer circumferential portion of the section. It is, therefore, possible to reduce the drag torque upon idling even when an oil amount is controlled as desired, and further, to achieve both of the maintenance of stable friction characteristics upon engagement and a reduction in idling drag. Accordingly, a wet-type multiplate clutch making use of friction plates according to the present invention is suited for use in an automatic transmission, friction device or the like.

This application claims the priority of Japanese Patent Application 2004-293241 filed Oct. 6, 2004, which is incorporated herein by reference.

The invention claimed is:

1. A friction plate for a wet-type multiplate clutch, said friction plate being provided with a core plate and friction linings fixed on opposite sides of said core plate, respectively, wherein each of said friction linings is formed such that at an inner section thereof located on a side radially inner than a radial center line thereof, said friction lining has a thickness that gradually increases from an inner circumferential portion of said inner section toward an outer circumferential portion of said section: and is also formed such that at a remaining outer section thereof on a side radially outer than said radial center line, said friction lining has a uniform thickness.

2. A friction plate according to claim 1, wherein each of said friction linings defines a planar surface at said inner section.

3. A friction plate according to claim 1, wherein each of said friction linings defines a curved surface at said inner section.

4. A friction plate according to claim 1, wherein each of said friction linings defines a stepped surface at said inner section.

5. A friction plate according to claim 1, wherein said inner section and an outer section of said friction lining are made of materials having different compression characteristics, respectively.

6. A friction plate according to claim 1, wherein said inner section has a radial width smaller than a half of an entire radial width of said friction lining.

7. A friction plate according to claim 1, wherein said friction linings are each provided with radial oil grooves extending from an inner circumference thereof to an outer circumference thereof.

8. A friction plate according to claim 1, wherein said friction linings are each segmented into fragmentary sectors, which are bonded on its corresponding side of said core plate.

9. A friction plate for a wet-type multiplate clutch, said friction plate being provided with a core plate and friction linings fixed on opposite sides of said core plate, respectively, wherein said friction linings are each segmented into fragmentary sectors, said fragmentary sectors are bonded on its corresponding side of said core plate, a predetermined plural number of said fragmentary sectors are each formed such that at a section thereof located on a side radially inner than a radial center line of the corresponding friction lining, said fragmentary sector has a thickness that gradually increases from an inner circumferential portion thereof toward an outer circumferential portion thereof, and the remaining ones of said fragmentary sectors have a uniform thickness.

10. A friction plate according to claim 9, wherein said predetermined plural number of said fragmentary sectors and the remaining ones of said fragmentary sectors are arranged alternately in a direction of a circumference of the corresponding friction lining.

11. A friction plate according to claim 10, wherein said predetermined plural number of said fragmentary sectors are arranged in registration with lubrication holes in a hub of said wet-type multiplate clutch, respectively.

12. A friction plate according to claim 10, wherein said predetermined plural number of said fragmentary sections are each formed such that at a remaining section thereof located on a side radially outer than a radial center line of the corresponding friction lining, said fragmentary section has a uniform thickness.

* * * * *